US012578634B2

(12) United States Patent (10) Patent No.: US 12,578,634 B2

Wu et al. (45) Date of Patent: Mar. 17, 2026

(54) LIGHT SOURCE CONTROL METHOD FOR DISPLAY DEVICE AND DISPLAY DEVICE

(71) Applicant: APPOTRONICS CORPORATION LIMITED, Shenzhen (CN)

(72) Inventors: Chao Wu, Shenzhen (CN); Xin Yu, Shenzhen (CN); Fei Hu, Shenzhen (CN); Yi Li, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 1032 days.

(21) Appl. No.: 17/425,708

(22) PCT Filed: Jan. 20, 2020

(86) PCT No.: PCT/CN2020/073088
§ 371 (c)(1),
(2) Date: Sep. 23, 2022

(87) PCT Pub. No.: WO2020/151629
PCT Pub. Date: Jul. 30, 2020

(65) Prior Publication Data

US 2023/0021207 A1     Jan. 19, 2023

(30) Foreign Application Priority Data

Jan. 25, 2019    (CN) .......................... 201910075647.3

(51) Int. Cl.
G03B 21/20 (2006.01)
(52) U.S. Cl.
CPC ..... G03B 21/2053 (2013.01); G03B 21/2013 (2013.01); G03B 21/204 (2013.01)

(58) Field of Classification Search
CPC ........... G03B 21/2053; G03B 21/2013; G03B 21/204

(Continued)

(56) References Cited

U.S. PATENT DOCUMENTS

2002/0141324 A1*  10/2002  Nagano .................. G11B 7/126
369/116

FOREIGN PATENT DOCUMENTS

CN         102045525 A  *  5/2011
CN         101243358 B  *  8/2011  ............. G03B 17/54

(Continued)

OTHER PUBLICATIONS

Translation of 101243358 (Year: 2025).*

(Continued)

*Primary Examiner* — Jerry L Brooks
(74) *Attorney, Agent, or Firm* — McCoy Russell LLP

(57)           ABSTRACT

Provided is an array light source. The array light source includes light-emitting modules, a wavelength conversion apparatus configured to convert excitation light into excited light, a control apparatus configured to transmit a light modulation signal, and a light modulation apparatus configured to modulate the excited light based on the light modulation signal, emit the modulated light, and form a modulated image. Each light-emitting module is configured to emit the excitation light. The light-emitting modules include edge light emitting modules distributed along an edge of the array light source and center light-emitting modules surrounded by the edge light-emitting modules. A maximum luminous intensity of the edge light-emitting modules is greater than that of the center light-emitting modules.

7 Claims, 14 Drawing Sheets

(58) Field of Classification Search
 USPC ........................................................ 353/85
 See application file for complete search history.

(56) References Cited

FOREIGN PATENT DOCUMENTS

| | | | | | |
|---|---|---|---|---|---|
| CN | 102314053 | A | * | 1/2012 | ......... G03B 21/2013 |
| CN | 103470973 | A | | 12/2013 | |
| CN | 203645420 | U | * | 6/2014 | ........... H02K 11/042 |
| CN | 203786454 | U | | 8/2014 | |
| CN | 104236854 | A | | 12/2014 | |
| CN | 104345532 | A | | 2/2015 | |
| CN | 105334687 | A | | 2/2016 | |
| CN | 106993356 | A | | 7/2017 | |
| JP | 2015055739 | A | | 3/2015 | |
| WO | WO-2011024498 | A1 | * | 3/2011 | ....... G02F 1/133603 |
| WO | 2014101730 | A1 | | 7/2014 | |

OTHER PUBLICATIONS

Translation of 102045525 (Year: 2025).*
Translation of 2011024498 (Year: 2025).*
Translation of 102314053 (Year: 2025).*
Translation of CN203645420 (Year: 2025).*
ISA China National Intellectual Property Administration, International Search Report Issued in Application No. PCT/CN2020/073088, Mar. 31, 2020, WIPO, 6 pages.
State Intellectual Property Office of the People's Republic of China, Office Action and Search Report Issued in Application No. 201910075647.3, Mar. 16, 2022, 8 pages. (Submitted with Partial Translation).

* cited by examiner

Brightness

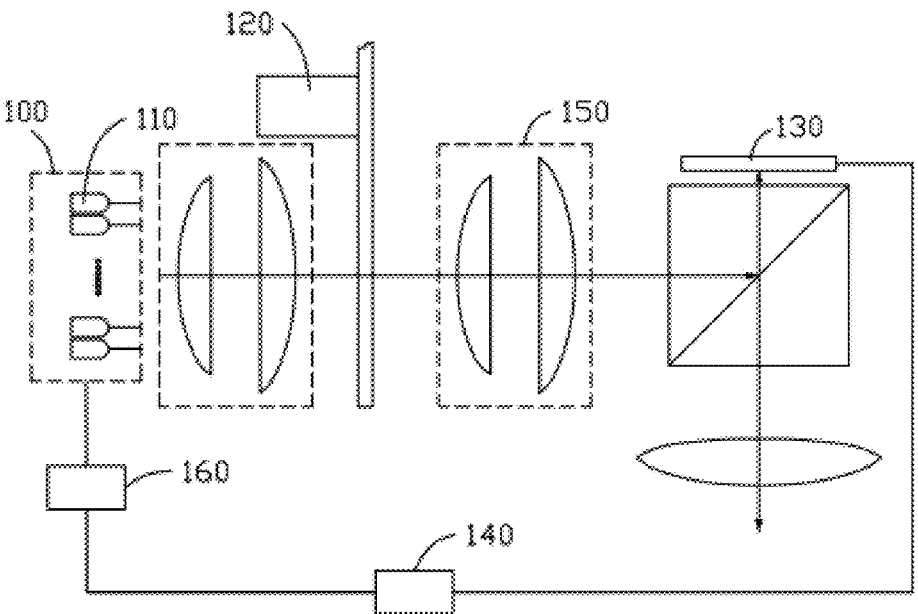
FIG. 6

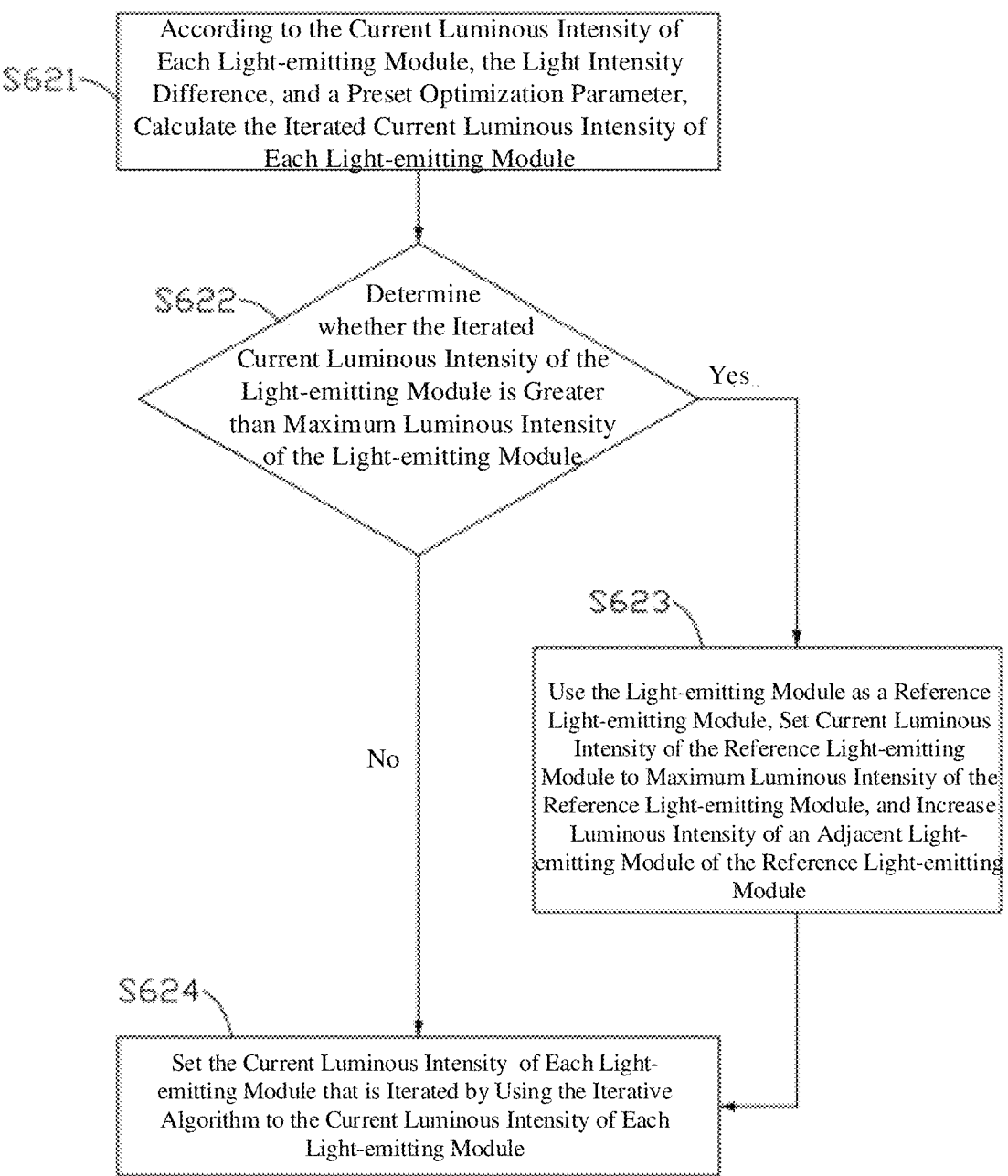

S621 — According to the Current Luminous Intensity of Each Light-emitting Module, the Light Intensity Difference, and a Preset Optimization Parameter, Calculate the Iterated Current Luminous Intensity of Each Light-emitting Module S622 — Determine whether the Iterated Current Luminous Intensity of the Light-emitting Module is Greater than Maximum Luminous Intensity of the Light-emitting Module Yes No S623 — Use the Light-emitting Module as a Reference Light-emitting Module, Set Current Luminous Intensity of the Reference Light-emitting Module to Maximum Luminous Intensity of the Reference Light-emitting Module, and Increase Luminous Intensity of an Adjacent Light-emitting Module of the Reference Light-emitting Module S624 — Set the Current Luminous Intensity of Each Light-emitting Module that is Iterated by Using the Iterative Algorithm to the Current Luminous Intensity of Each Light-emitting Module

FIG. 11

LIGHT SOURCE CONTROL METHOD FOR DISPLAY DEVICE AND DISPLAY DEVICE

CROSS REFERENCE TO RELATED APPLICATIONS

The present application is a U.S. National Phase of International Application No. PCT/CN2020/073088 entitled "LIGHT SOURCE CONTROL METHOD FOR DISPLAY DEVICE, AND DISPLAY DEVICE," and filed on Jan. 20, 2020. International Application No. PCT/CN2020/073088 claims priority to Chinese Patent Application No. 201910075647.3 filed on Jan. 25, 2019. The entire contents of each of the above-listed applications are hereby incorporated by reference for all purposes.

TECHNICAL FIELD

The present disclosure relates to the field of display technologies, and to a light source control method for a display device and the display device.

BACKGROUND AND SUMMARY

At present, contrast achieved by a projection display technology of a monolithic light modulation apparatus is much lower than brightness resolution of human eyes. Therefore, a projected image is not sufficiently bright in bright regions and not sufficiently dark in dark regions, resulting in poor gradation in brightness and darkness of the projected image and loss of lots of details. A high-dynamic range (HDR) projection system aims to increase a display brightness range, such that both bright and dark fields in an image can display rich gray scale information, thereby greatly improving the image effect and viewing experience of an audience.

A first aspect of the present disclosure provides a display device, and the display panel includes an array light source, a wavelength conversion apparatus, a control apparatus, and a light modulation apparatus. The array light source includes light-emitting modules, each configured to emit an excitation light, and the light-emitting modules include edge light emitting modules distributed along an edge of the array light source and center light-emitting modules surrounded by the edge light-emitting modules. A maximum luminous intensity of one of the edge light-emitting modules is greater than that of one of the center light-emitting modules. The wavelength conversion apparatus is configured to convert the excitation light into excited light. The control apparatus is configured to transmit a light modulation signal. The light modulation apparatus is configured to modulate the excited light based on the light modulation signal, emit the modulated light, and form a modulated image.

A second aspect of the present disclosure provides a light source control method applied to the display device. The light source control method includes the following steps:

partitioning a current frame of image to obtain image regions, wherein each of the light-emitting modules is at least configured for main illumination for one of the image regions, each of the image regions including pixels, and the light modulation apparatus including modulation regions corresponding to the image regions in one-to-one correspondence;

obtaining, based on image data of the current frame of image, a target light intensity value of one of the modulation regions in the light modulation apparatus corresponding to each of the image regions in the current frame of image;

setting a current luminous intensity of the light-emitting modules to an initial value;

predicting a predicted light intensity value of each of the modulation regions of the light modulation apparatus corresponding to each of the image regions when luminous intensity of each of the light-emitting modules equals to the current luminous intensity;

calculating light intensity differences between a target light intensity value of each image region and the predicted light intensity value of the modulation region corresponding to each image region; and determining whether a maximum light intensity difference in the light intensity differences is smaller than a preset threshold; in accordance with a determination that the maximum light intensity difference is smaller than the preset threshold, determining, based on the current luminous intensity of each of the light-emitting modules, a light-emitting power of at least one of the light-emitting modules that displays the current frame of image; and in accordance with a determination that the maximum light intensity difference is not smaller than the preset threshold, then increasing the current luminous intensity of each of the light-emitting modules with an iterative algorithm.

The display device provided in the present disclosure facilitates an improvement of an area ratio of a uniform fluorescent light field irradiated to the light modulation apparatus, and alleviate edge distortion of a display image caused by fluorescence diffusion. According to the light source control method for the display device provided in the present disclosure, light-emitting power of the light-emitting modules is gradually increased by using an iterative algorithm, until luminous intensity of all the light-emitting modules can satisfy display brightness required by an image to be displayed, which reduces light loss, thereby saving energy.

BRIEF DESCRIPTION OF THE FIGURES

To describe the technical solutions in the embodiments/implementations of the present disclosure more clearly, the following briefly describes the accompanying drawings required for describing the embodiments/implementations. Apparently, the accompanying drawings in the following description show merely some embodiments/implementations of the present disclosure, and a person of ordinary skill in the art may further derive other drawings from these accompanying drawings without creative efforts.

FIG. 1 is a schematic diagram of brightness distribution of a fluorescent light field received by a light modulation apparatus when all lasers in an array light source are fully turned on.

FIG. 6 is a schematic diagram of a display device according to an embodiment of the present disclosure.

FIG. 11 is a flowchart of block S621 to block S624 of a control method for a display device according to an embodiment of the present disclosure.

Figure 1:
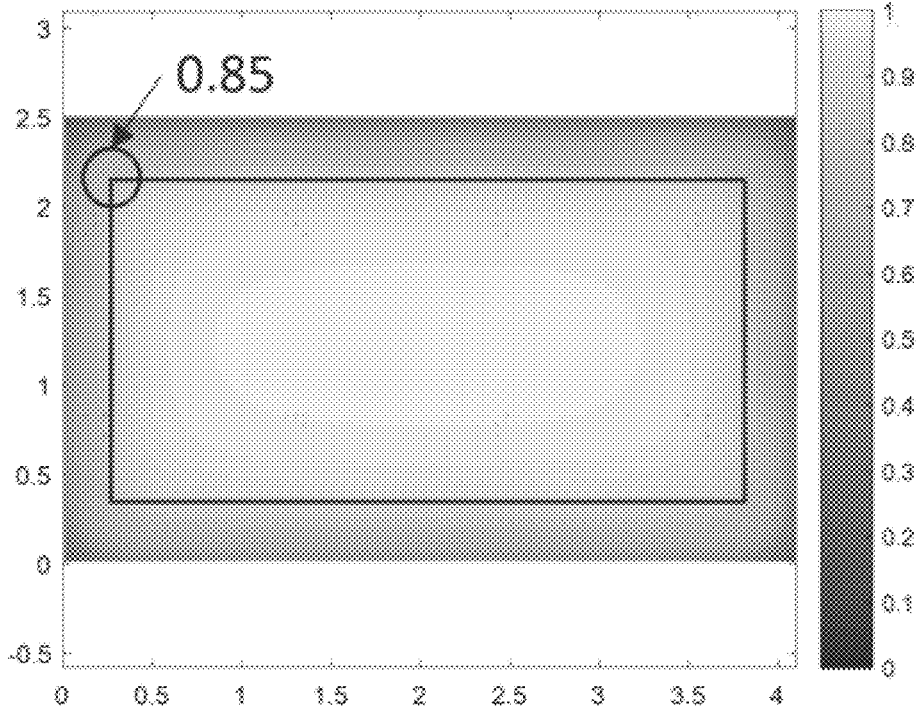

| Description of main reference numerals | |
| --- | --- |
| Display device | 10 |
| Array light source | 100 |
| Light-emitting module | 110 |
| Edge light-emitting module | 111 |
| First laser | 111a |
| Second laser | 111b |
| Center light-emitting module | 112 |
| Wavelength conversion apparatus | 120 |
| Relay lens | 150 |
| Light modulation apparatus | 130 |
| Control apparatus | 140 |
| Power control apparatus | 160 |
| Step | S10, S20, S30, S40, S50, S60, S61, S62, S621, S622, S623, and S624 |
| Image region | $I_0$ |
| Modulation region | $M_0$ |
| Target light intensity value | $P_0$ |
| Predicted light intensity value | $P_1$ |
| Current luminous intensity | P |
| Maximum luminous intensity | $P_{max}$ |
| Preset optimization parameter | T |
| Light intensity difference | $\Delta P$ |
| Maximum light intensity difference | $\Delta P_{max}$ |
| Preset threshold | $\Delta P_0$ |

The present disclosure is further described in the following detailed description with reference to the accompanying drawings.

DETAILED DESCRIPTION

For a better understanding of the technical solutions in this application, the embodiments of this application are described in detail below with reference to the accompanying drawings.

To make the objectives, features and advantages of the present disclosure more comprehensible, the present disclosure is described in detail below with reference to the accompanying drawings and specific embodiments. It should be noted that without conflict, the embodiments of this application and features of the embodiments may be combined with each other.

Many specific details are set forth in the following description to facilitate a full understanding of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure.

Currently, a method for achieving HDR display in a projection system is similar to a local dimming used in a liquid crystal display panel with a light-emitting diode (LED) as the backlight source, the local dimming uses an array light source as a light source for a projection device, and each light source is configured for main illustration of one display imaging region. During projection display, a luminous intensity of the light source is dynamically controlled according to peak brightness of each region of the image to achieve high-contrast display. This method achieves high contrast while avoiding unnecessary light energy loss.

In the conventional technology, in a projection system that uses laser light to excite fluorescence for light modulation, the fluorescence is collected and then passes through a homogenizing device such as a square rod or a fly-eye, and a uniform light field is irradiated on a light modulation apparatus after homogenization. In a typical HDR projection system using local dimming, a blue laser light source array is used to excite a fluorescent wheel to generate red, green, and blue illumination light with a specific brightness distribution. The red illumination light and the green illumination light are provided by fluorescence excited by a pre-modulated blue light field. The blue illumination light is directly provided by the pre-modulated blue light field. However, in the HDR projection system using local dimming, a fluorescent light field generated after laser light excites a phosphor is a light field with a specific light intensity distribution and image information, then the fluorescent light field should be directly irradiated to the light modulation apparatus and cannot pass through a homogenizing device for homogenization.

Figure 2:
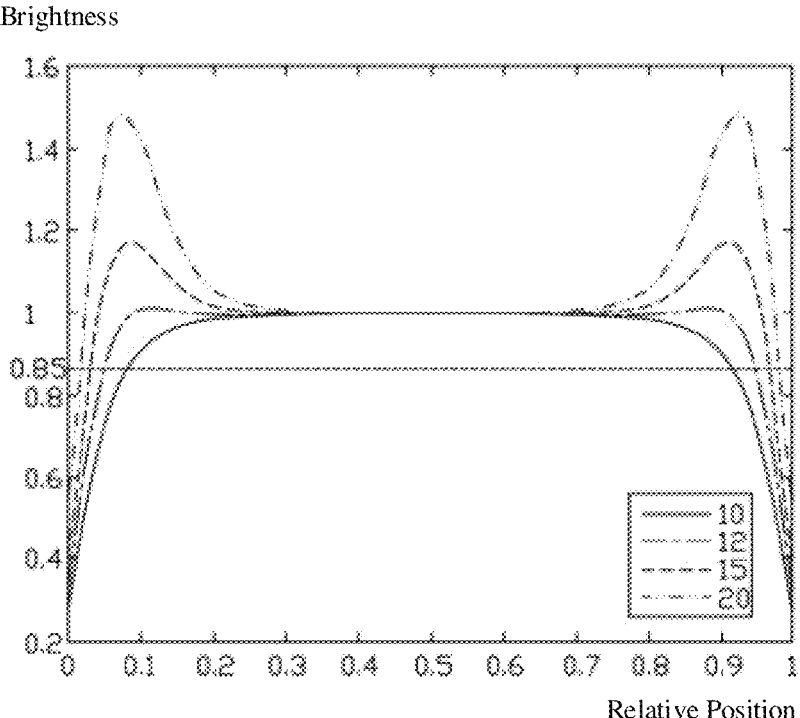
FIG. 2 is a line graph of diagonal brightness of fluorescent light fields excited by using lasers of different power, where horizontal coordinates are coordinates of relative positions of diagonal lines with one end of the diagonal line of a fluorescent light field as an origin and a diagonal length of 1, and vertical coordinates are light intensity values.

When a beam of excitation light is irradiated to the phosphor, excited fluorescent light field diffuses to some extent, a diffusion property of the fluorescent light field can be represented by using a point spread function, and a light intensity distribution status of the fluorescent light field on a projection surface can be obtained according to the point spread function. During projection of a full white field, that is, when a laser is fully turned on, brightness of a region surrounding the fluorescent light field decreases slowly, that is, only a uniform light field region in the middle can be used, and the surrounding non-uniform light field region needs to be shielded by a diaphragm, causing loss of a large amount of light. When the laser is fully turned on, the fluorescence illumination light field on the light modulation apparatus is shown in FIG. 1. It can be learned that brightness of an edge region has attenuated to approximately 50% of brightness of the uniform light field region in the middle. Brightness at corners in the figure has even attenuated to approximately 25% of the brightness of the uniform light field region in the middle, far from a requirement of a DCI standard for uniformity (that is, brightness of an edge of a projection image is not less than 85% of brightness of a center). To meet the requirement of the DCI standard for uniformity, only a light field of approximately 60% of an area in the middle can be used for display. In this case, loss of light efficiency can be up to 45%. In addition, because only the uniform light field region in the middle can be used, a quantity of possible partitions of the display image is reduced, affecting clarity of the display image. Referring to FIG. 2, it can be learned that higher power of a laser used indicates a larger area of a uniform light field that can be used when brightness of an edge region of a fluorescent light field attenuates to 85% of a center region and greater light efficiency of a system accordingly.

Figure 3:
FIG. 3 shows an image to be displayed.
Figure 4:
FIG. 4 shows a projection image emitted by a projection system using a conventional array light source according to the image to be displayed in FIG. 3.
Figure 5:
FIG. 5 is a distribution diagram of an image brightness difference between the image to be displayed in FIG. 3 and the projection image in FIG. 4.

Referring to FIG. 3 to FIG. 5, in an HDR projection system using local dimming that excites fluorescence with laser light for light modulation, if a general array light source structure is used, maximum display brightness of the edge region of the fluorescent light field cannot meet the brightness requirement due to the diffusion property of the fluorescence, and it is difficult to restore an original image even after secondary modulation by the light modulation apparatus. Consequently, a projection image is distorted, and image distortion at corners of the projection image is the largest, losing a lot of details.

A display device provided in the embodiments of the present disclosure can be an array light source projection system such as a theater projector, a laser television, a commercial education projector, and a micro projector. A light source control method for the display device provided in the embodiments of the present disclosure can be applied to a display device including an array light source such as a theater projector, a laser television, a commercial education projector, and a micro projector. The display device provided in the embodiments of the present disclosure can increase a uniform light field region that satisfies a uniformity requirement, thereby improving system light efficiency. The control method for the display device provided in the embodiment of the present disclosure can reduce light-emitting power of a light-emitting module to save energy, while ensuring that brightness of an emitted modulated image meets a requirement of brightness of an image to be displayed.

Referring to FIG. 6, a display device 10 provided in some embodiments of the present disclosure includes an array light source 100, a wavelength conversion apparatus 120, a control apparatus 140, and a light modulation apparatus 130. The array light source 100 is configured to emit a plurality of beams of excitation light. The wavelength conversion apparatus 120 is configured to convert the excitation light into excited light. The control apparatus 140 is configured to transmit a light modulation signal. The light modulation apparatus 130 is configured to modulate the excited light according to the light modulation signal, emit modulated light, and form a modulated image.

Further, the array light source 100 includes a plurality of light-emitting modules 110, and each light-emitting module 110 is configured to emit one beam of excitation light. In an embodiment, each light-emitting module 110 emits one beam of blue laser light. In other embodiments, the light-emitting module 110 can emit white light, red light, yellow light, green light, ultraviolet light, or light of other colors.

Figure 7:
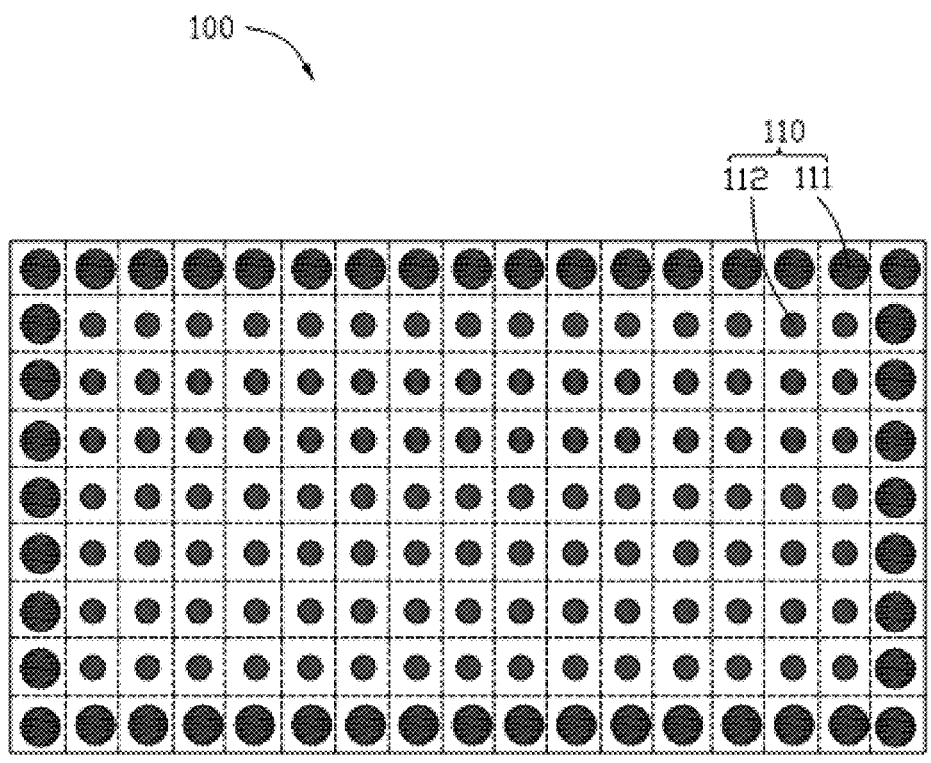
FIG. 7 is a schematic diagram of an array light source according to an embodiment of the present disclosure.
Figure 8:
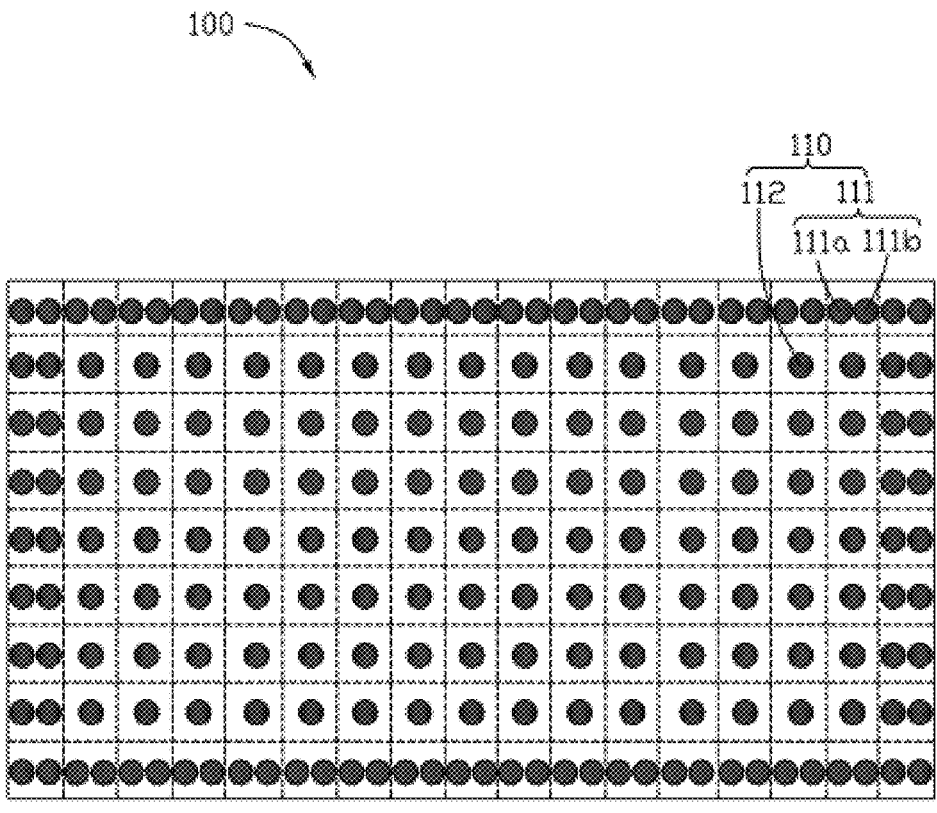
FIG. 8 is a schematic diagram of an array light source according to another embodiment of the present disclosure.

Referring to FIG. 7 and FIG. 8, the light-emitting modules 110 include a plurality of edge light-emitting modules 111 distributed along an edge of the array light source 100, and a plurality of center light-emitting modules 112 surrounded by the plurality of edge light-emitting modules 111. In an embodiment, the array light source 100 is rectangular, and the edge light-emitting modules 111 are light-emitting modules 110 distributed on the outermost periphery of the array light source 100. In other embodiments, the array light source 100 can be circular, polygonal, or of any other shapes. A quantity of the edge light-emitting modules 111 can be adjusted according to an actual situation. Specifically, each light-emitting module 110 includes at least one laser, and a maximum luminous intensity of the edge light-emitting module 111 is greater than a maximum luminous intensity of the center light-emitting module 112.

In an embodiment, each edge light-emitting module 111 includes a same numbers of lasers as each center light-emitting module 112, and a rated power of a laser in the edge light-emitting module 111 is greater than a rated power of a laser in the center light-emitting module 112. Referring to FIG. 7, in an embodiment, each edge light-emitting module 111 and each center light-emitting module 112 have one laser, and the rated power of the laser in the edge light-emitting module 111 is twice the rated power of the laser in the center light-emitting module 112. In other embodiments, the rated power of the laser in each edge light-emitting module 111 can be M times (M is any value greater than 1) the rated power of the laser in each center light-emitting module 112.

In a variant embodiment, a quantity of lasers included by each edge light-emitting module 111 is greater than a quantity of lasers included by each center light-emitting module 112, and the rated power of each edge light-emitting module 111 is not lower than the rated power of each center light-emitting module 112. Specifically, referring to FIG. 8, in an embodiment, each edge light-emitting module 111 has two lasers, i.e., a first laser 111a and a second laser 111b. Laser light emitted by the first laser 111a and laser light emitted by the second laser 111b are combined and then emitted. Each center light-emitting module 112 has one laser. In other embodiments, the quantity of lasers in the edge light-emitting module 111 can be N times (N is any integer value greater than 1) the quantity of lasers in the center light-emitting module 112.

Referring to FIG. 6 again, the wavelength conversion apparatus 120 is configured to convert excitation light into excited light. The wavelength conversion apparatus 120 includes a phosphor material. The excitation light emitted by each light-emitting module 110 is converted into fluorescence dispersed to all directions on the wavelength conversion apparatus 120. Specifically, in an embodiment, the wavelength conversion apparatus 120 includes a red phosphor material and a green phosphor material. Red excited light and green excited light are excited when the excitation light emitted by the array light source 100 are incident to the wavelength conversion apparatus. In other embodiments, the phosphor material of the wavelength conversion apparatus 120 can further excite excited light of yellow, orange, or other colors. The wavelength conversion apparatus 120 can excite excited light with one or more colors.

The light modulation apparatus 130 is configured to modulate the excited light, emit modulated light, and form a modulated image. Specifically, the light modulation apparatus 130 can be a digital micro-mirror device (DMD), a liquid crystal on silicon (LCOS), or a liquid crystal display (LCD) panel. In this embodiment, the light modulation apparatus 130 includes a plurality of modulation regions, and the modulation regions correspond the light-emitting modules 110 in one-to one correspondence.

Figure 9:
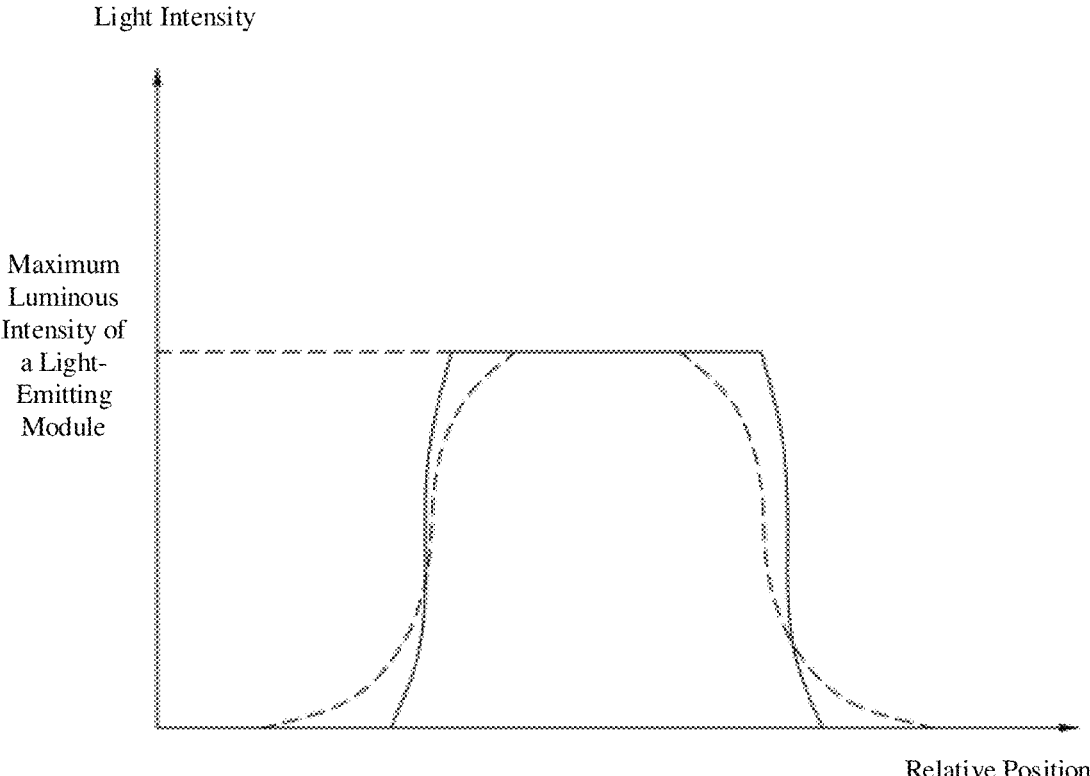
FIG. 9 is a schematic diagram of a diagonal light intensity function relationship of excited light fields before and after excited light passes through a relay lens.

Optionally, the display device 10 provided in an embodiment further includes a relay lens 150. The relay lens 150 is configured to focus excited light emitted from the wavelength conversion apparatus 120 and dispersing to all directions, to increase an available uniform light field area of an excited light field irradiated to the light modulation apparatus 130. If a conventional array laser light source with light-emitting modules having a same maximum light-emitting power is employed, a line graph of diagonal brightness distribution of excited light fields of the excited light radiated to the light modulation apparatus 130 before and after the excited light passes through the relay lens 150 is shown in FIG. 9. A light intensity mapping relationship before and after the excited light fields pass through the relay lens 150 can be designed according to an actual situation.

Referring to FIG. 6 again, the display device 10 provided in an embodiment further includes a power control apparatus 160. The control apparatus 140 is further configured to transmit a power control signal. The power control apparatus 160 controls light-emitting power of the light-emitting module 110 according to the power control signal, so as to adjust a luminous intensity of the light-emitting module 110.

In the array light source 100 provided in this embodiment, the maximum luminous intensity of the edge light-emitting module 111 is set to be greater than the maximum luminous intensity of the center light-emitting module 112. This can increase brightness of an edge region of a fluorescent light field irradiated to the light modulation apparatus 130, and increase a uniform light field available for the fluorescent light field, thereby improving system light efficiency, and further alleviating distortion caused by darkening of an edge of the fluorescent light field.

Some embodiments of the present disclosure further provide a light source control method for a display device. The control method for the display device can be applied to the display device 10, or the control method can be applied to another display device including an array light source configured to emit a plurality of beams of excitation light, a wavelength conversion apparatus configured to convert excitation light into excited light, and a light modulation apparatus configured to modulate the excited light, emit modulated light, and form a modulated image. The array light source includes a plurality of light-emitting modules configured to emit excitation light.

Figure 10:
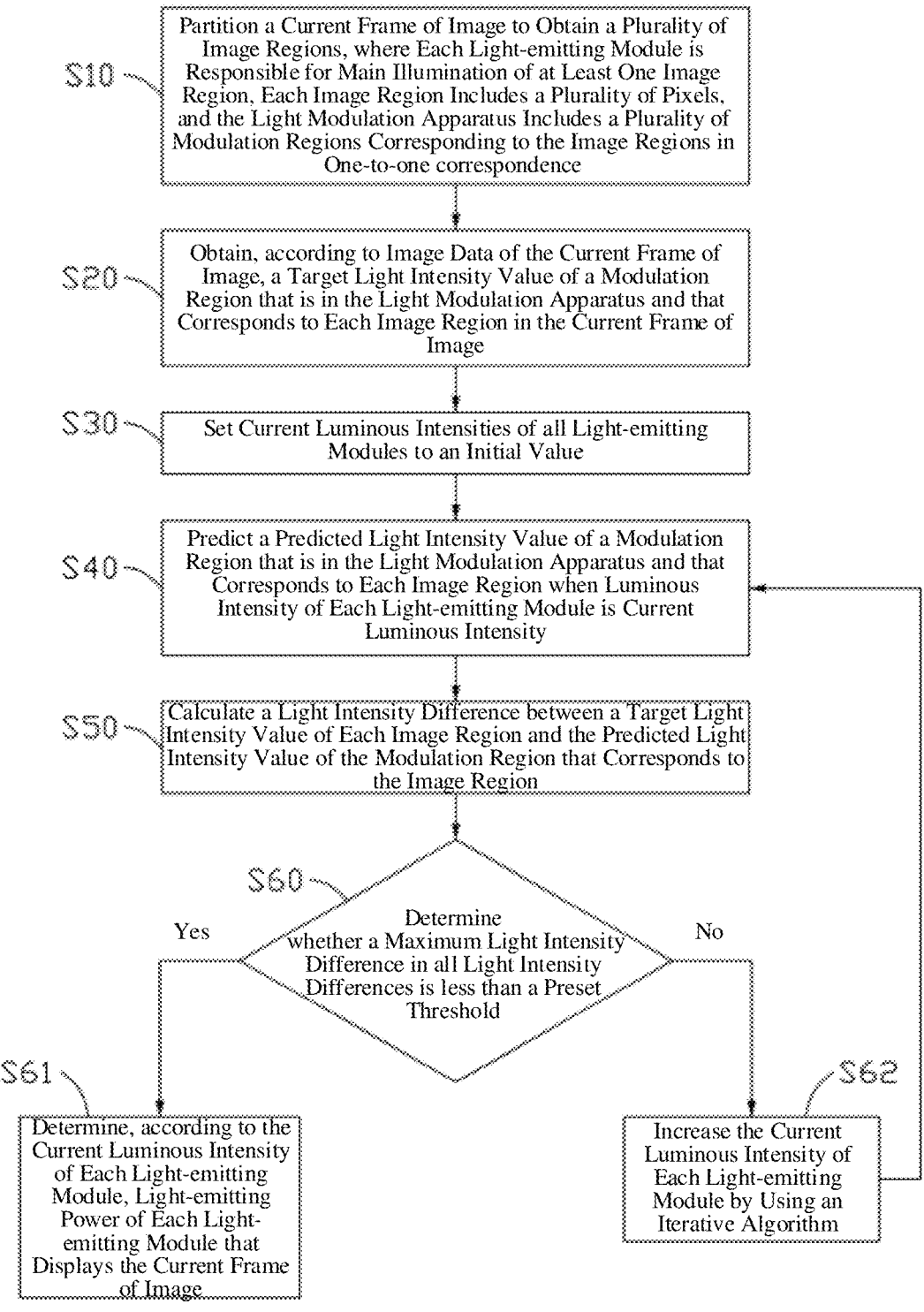
FIG. 10 is a flowchart of block S10 to block S60 of a control method for a display device according to an embodiment of the present disclosure.

Referring to FIG. 10, the light source control method for the display device provided in this embodiment includes the following steps.

At block S10, a current frame of image is partitioned to obtain a plurality of image regions $I_0$, where each light-emitting module is configured for main illumination of at least one image region $I_0$, each image region $I_0$ includes a plurality of pixels, and the light modulation apparatus includes a plurality of modulation regions $M_0$ corresponding to the image regions $I_0$ in one-to-one correspondence. In an embodiment, each light-emitting module is responsible for main illumination of one image region $I_0$, and the light-emitting modules correspond, in one-to-one correspondence, to modulation regions $M_0$ corresponding to image regions $I_0$, for whose main illumination the light-emitting modules are responsible.

At block S20, according to image data of the current frame of image, a target light intensity value $P_0$ of a modulation region $M_0$ that is in the light modulation apparatus and that corresponds to each image region $I_0$ in the current frame of image is obtained. In an embodiment, a target light intensity value $P_0$ of each modulation region $M_0$ in the light modulation apparatus is a maximum value in brightness values of all pixels in each corresponding image region $I_0$ in the current frame of image.

At block S30, current luminous intensities P of all light-emitting modules are set to an initial value. Specifically, the initial value of the current luminous intensities P of all the light-emitting modules in this embodiment are set to zero.

At block S40, a predicted light intensity value $P_1$ of a modulation region $M_0$ that is in the light modulation apparatus corresponding to each image region $I_0$ are predicted when a luminous intensity of each light-emitting module equals to the current luminous intensity P.

At block S50, a light intensity difference $\Delta P$ between a target light intensity value $P_0$ of each image region $I_0$ and the predicted light intensity value $P_1$ of the modulation region $M_0$ that corresponds to the image region $I_0$ are calculated.

At block S60, whether a maximum light intensity difference $\Delta P_{max}$ in all light intensity differences $\Delta P$ is less than a preset threshold $\Delta P_0$ is determined. In this step, block S60 further includes block S61 and block S62. At block S61, if a result of block S60 is yes, a light-emitting power of each light-emitting module that displays the current frame of image is determined according to the current luminous intensity P of each light-emitting module. At block S62, if a result of block S60 is no, the current luminous intensity P of each light-emitting module is increased by using an iterative algorithm.

Further, referring to FIG. 11, block S62 further includes block S621, block S622, block S623, and block S624. Block S621 includes calculating an iterated current luminous intensity P of each light-emitting module according to the current luminous intensity P of each light-emitting module, the light intensity difference $\Delta P$, and a preset optimization parameter T. An increment of the current luminous intensity P of each light-emitting module is determined based on the preset optimization parameter T and the light intensity difference $\Delta P$. Specifically, in this embodiment, iterated luminous intensity of each light-emitting module is a sum of the current luminous intensity P of each light-emitting module and a product of the light intensity difference $\Delta P$ corresponding to each modulation region $M_0$ and the preset optimization parameter T, that is, the iterated luminous intensity of each light-emitting module is $P+\Delta P \times T$. In this embodiment, the preset optimization parameter T can be 0.01, 0.1, 0.2, or other values, and can be specifically adjusted according to an actual situation. A smaller preset optimization parameter T indicates a smaller increment of the current luminous intensity P of the light-emitting module in one iteration and a finer adjustment of the luminous intensity of the light-emitting module, but a quantity of iterations increases. Block S622 includes determining whether the iterated current luminous intensity P of the light-emitting module is greater than maximum luminous intensity $P_{MAX}$ of the light-emitting module.

Block S623 includes: if a result of block S622 is no, setting the luminous intensity of each light-emitting module that is iterated by using the iterative algorithm to the current luminous intensity P of each light-emitting module. Block S624 includes: if a result of block S622 is yes, taking the light-emitting module as a reference light-emitting module, setting a current luminous intensity P of the reference light-emitting module to a maximum luminous intensity $P_{MAX}$ of the reference light-emitting module, and increasing a luminous intensity of an adjacent light-emitting module of the reference light-emitting module, to increase the predicted light intensity value $P_1$ of the modulation region $M_0$ corresponding to the image region $I_0$ for whose main illumination the reference light-emitting module is responsible. Specifically, an increment of the luminous intensity of the adjacent light-emitting module is inversely proportional to a distance X from the adjacent light-emitting module to the reference light-emitting module. In this embodiment, the iterated luminous intensity of the adjacent light-emitting module can be $$P + \frac{\Delta P \times T}{X}.$$

Block S624 is performed after block S623. After block S62 is performed, block S40, block S50, and block S60 are performed again.

In this embodiment, the predicted light intensity value $P_1$ of each modulation region $M_0$ in block S40 not only includes a light intensity generated by the light-emitting module corresponding to the modulation region $M_0$ to the modulation region $M_0$, but also includes a light intensity generated by other light-emitting modules in the array light source to the modulation region $M_0$. Therefore, when the light-emitting power of the light-emitting module corresponding to the modulation region $M_0$ is reduced, the predicted light intensity value $P_1$ of the modulation region $M_0$ can also be close to the target light intensity value $P_0$ of the corresponding image region $I_0$, thereby saving energy.

In the light source control method for the display device provided in this embodiment, when the light-emitting module is in an initial state in which the light-emitting power is zero, the light-emitting power of the light-emitting module is gradually increased by using the iterative algorithm, until the luminous intensity of the light-emitting module can satisfy a required display brightness of each image region $I_0$ of the image to be displayed for which the each light-emitting module is responsible. Compared with a conventional-technology manner in which light-emitting power of all light-emitting modules is turned on to a maximum light-emitting power and then excitation light is modulated according to image data of an image to be displayed, the light source control method for the display device provided in this embodiment can reduce the light-emitting power of the light-emitting module to save energy, while ensuring that brightness of an emitted modulated image meets a requirement of brightness of an image to be displayed.

When the light source control method for the display device provided in this embodiment of the present disclosure is applied to the display device 10, after the light-emitting power of each light-emitting module 110 that displays the current frame of image is determined through block S61, the control apparatus 140 transmits the power control signal according to the current light-emitting power of each light-emitting module 110 that displays the current frame of image, and the power control apparatus 160 adjusts the luminous intensity of each light-emitting module 110 in real time according to the power control signal. In addition, the control apparatus 140 further calculates a light compensation amount of the light modulation apparatus 130 according to the light intensity difference $\Delta P$ corresponding to the current light-emitting power of each light-emitting module 110 that displays the current frame of image. The control apparatus 140 transmits a light modulation signal according to the light compensation amount. The light modulation apparatus 130 modulates the excited light according to the light modulation signal.

Figure 12:
FIG. 12 shows a projection image emitted by a display device when a light source control method for the display device according to embodiments of the present disclosure is applied to the display device according to the embodiments of the present disclosure.
Figure 13:
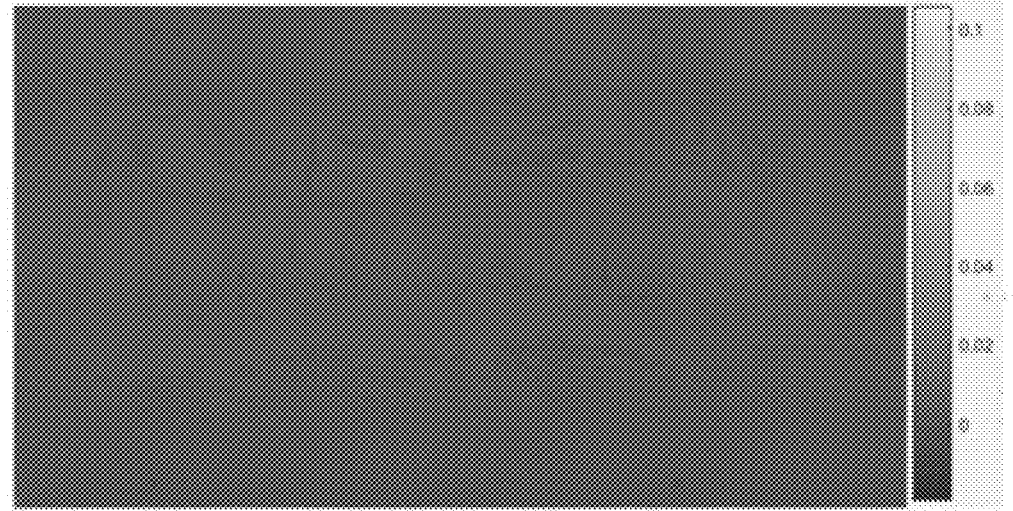
FIG. 13 is a distribution diagram of a light intensity difference between the image to be displayed in FIG. 3 and the projection image in FIG. 12.
Figure 14:
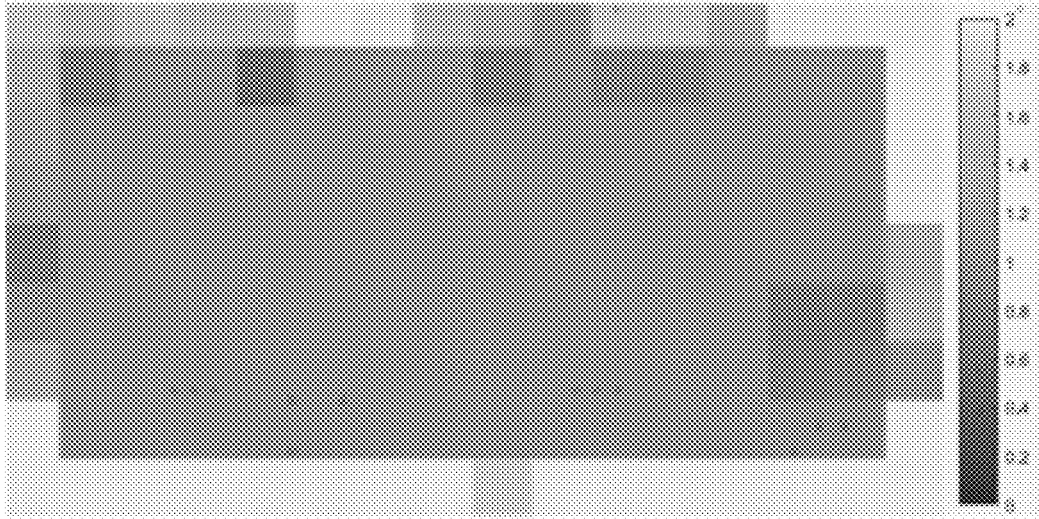
FIG. 14 is a schematic diagram of luminous intensity of an array light source adjusted by using a light source control method for a display device according to an embodiment of the present disclosure.

Referring to FIG. 12 to FIG. 14, that the maximum luminous intensity $P_{max}$ of the edge light-emitting module 111 is twice the maximum luminous intensity $P_{max}$ of the center light-emitting module 112 is taken as an example for description. To make the brightness of the edge of the excited light field received by the light modulation apparatus 130 reach display brightness required by the image to be displayed, the light source control method for the display device makes the luminous intensity of the edge light-emitting modules 111 in the array light source 100 generally greater than luminous brightness of the center light-emitting module 112, thereby effectively alleviating distortion caused by darkening of the edge of the excited light field received by the light modulation apparatus 130.

It should be noted that within the spirit scope or basic features of the present disclosure, the specific technical solutions of the display device in the implementations are mutually applicable, and for brevity and in order to avoid repetition, details are not described herein again.

For a person skilled in the art, it is apparent that the present disclosure is not limited to the details of the foregoing exemplary embodiments, and that the present disclosure can be implemented in other specific forms without departing from the spirit or basic features of the present disclosure. Therefore, the embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure. Any reference numerals in the claims should not be considered as limiting the claims involved. In addition, it is apparent that the word "including" does not exclude other units or steps, and a singular number does not exclude a plural number. A plurality of apparatuses stated in the apparatus claims can also be implemented by a same apparatus or system through software or hardware. Words such as first and second are used to denote names and do not indicate any particular order.

Finally, it should be noted that the foregoing embodiments are only intended to describe, rather than to limit the technical solutions of the present disclosure. Although the present disclosure is described in detail with reference to the embodiments mentioned above, a person of ordinary skill in the art should understand that modifications or equivalent replacements can be made to the technical solutions of the present disclosure without departing from the spirit and scope of the technical solutions of the present disclosure.

The invention claimed is:

1. A light source control method applied to a display device, wherein the display device comprises:

an array light source, wherein the array light source comprises light-emitting modules, each configured to emit an excitation light, wherein the light-emitting modules comprise edge light emitting modules distributed along an edge of the array light source and center light-emitting modules surrounded by the edge light-emitting modules, and wherein a maximum luminous intensity of the edge light-emitting modules is greater than that of the center light-emitting modules;

a wavelength conversion apparatus configured to convert the excitation light into excited light;

a control apparatus configured to transmit a light modulation signal; and a light modulation apparatus configured to modulate the excited light based on the light modulation signal, emit the modulated light, and form a modulated image; and wherein the light source control method comprises:

partitioning a current frame of the image to obtain image regions, wherein each of the light-emitting modules is at least configured for main illumination for one of the image regions, each of the image regions comprising pixels, and wherein the light modulation apparatus comprises modulation regions corresponding to the image regions in one-to-one correspondence;

obtaining, based on image data of the current frame of image, a target light intensity value of one of the modulation regions in the light modulation apparatus corresponding to each of the image regions in the current frame of image;

setting a current luminous intensity of the light-emitting modules to an initial value;

predicting a predicted light intensity value of each of the modulation regions of the light modulation apparatus corresponding to each of the image regions when luminous intensity of each of the light-emitting modules equals to the current luminous intensity;

calculating light intensity differences between a target light intensity value of each image region and the predicted light intensity value of the modulation region corresponding to each image region; and determining whether a maximum light intensity difference among the light intensity differences is smaller than a preset threshold;

in accordance with a determination that the maximum light intensity difference is smaller than the preset threshold, determining, based on the current luminous intensity of each of the light-emitting modules, a light-emitting power of at least one of the light-emitting modules that displays the current frame of image; and in accordance with a determination that the maximum light intensity difference is not smaller than the preset threshold, increasing the current luminous intensity of each of the light-emitting modules with an iterative algorithm.

2. The light source control method for the display device according to claim 1, wherein said obtaining, based on the image data of the current frame of image, the target light intensity value of one of the modulation regions in the light modulation apparatus corresponding to each of the image regions in the current frame of image, comprises:

setting the target light intensity value of each of the modulation regions in the light modulation apparatus to be a maximum value of brightness values of the pixels in each of the image regions in the current frame of image.

3. The light source control method for the display device according to claim 1, wherein the iterative algorithm comprises:

calculating iterated current luminous intensity of each of the light-emitting modules based on the current luminous intensity of each of the light-emitting modules, the light intensity differences, and a preset optimization parameter, wherein an increment of the current luminous intensity of each of the light-emitting modules is determined based on the preset optimization parameter and the light intensity differences.

4. The light source control method for the display device according to claim 3, comprising:

if the iterated current luminous intensity of each of the light-emitting modules is greater than a maximum luminous intensity of the light-emitting module, then:

taking the light-emitting module as a reference light-emitting module;

setting a current luminous intensity of the reference light-emitting module to be a maximum luminous intensity of the reference light-emitting module;

and increasing a luminous intensity of an adjacent light-emitting module of the light-emitting modules that is adjacent to the reference light-emitting module.

5. The light source control method for the display device according to claim 4, wherein said increasing the luminous intensity of the adjacent light-emitting module to the reference light-emitting module, comprises:

setting an increment of the luminous intensity of the adjacent light-emitting module to be inversely proportional to a distance from the adjacent light-emitting module to the reference light-emitting module.

6. The light source control method for the display device according to claim 1, wherein the predicted light intensity value of each of the modulation regions comprises a light intensity generated by the light-emitting module corresponding to the modulation region to the modulation region, and a light intensity generated by another one of the light-emitting modules in the array light source to the modulation region.

7. The light source control method for the display device according to claim 3, wherein the preset optimization parameter T is 0.01, 0.1, or 0.2.

* * * * *